US012086402B2

(12) United States Patent
Opara et al.

(10) Patent No.: US 12,086,402 B2
(45) Date of Patent: Sep. 10, 2024

(54) SPLIT-SCREEN DISPLAY IMPLEMENTATION IN COMPUTING DEVICE

(71) Applicant: GUANGDONG OPPO MOBILE TELECOMMUNICATIONS CORP., LTD., Guangdong (CN)

(72) Inventors: Edward Opara, New York, NY (US); Jody Hudson-Powell, London (GB)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/147,701

(22) Filed: Dec. 28, 2022

(65) Prior Publication Data

US 2023/0236720 A1 Jul. 27, 2023

Related U.S. Application Data

(63) Continuation of application No. PCT/CN2020/134602, filed on Dec. 8, 2020.

(51) Int. Cl.
*G06F 9/451* (2018.01)
*G06F 1/16* (2006.01)
(Continued)

(52) U.S. Cl.
CPC .......... *G06F 3/0486* (2013.01); *G06F 1/1652* (2013.01); *G06F 3/04817* (2013.01);
(Continued)

(58) Field of Classification Search
CPC ................. G06F 3/0486; G06F 1/1652; G06F 3/04817; G06F 3/0482; G06F 3/04845;
(Continued)

(56) References Cited

U.S. PATENT DOCUMENTS 10,126,914 B2 * 11/2018 Hiroura ................. G06F 3/0488
10,126,944 B2 * 11/2018 Wang .................. G06F 3/04842
(Continued)

FOREIGN PATENT DOCUMENTS

CN 103902220 A 7/2014
CN 105573740 A 5/2016
(Continued)

OTHER PUBLICATIONS

Android N Tip—How to enable split-screen multitasking, retrived from—https://www.youtube.com/watch?v=ITPMNY16s3g, May 4, 2016, 5 pages (Year: 2016).*
(Continued)

*Primary Examiner* — Yongjia Pan
(74) *Attorney, Agent, or Firm* — PERKINS COIE LLP

(57) ABSTRACT

Introduced here are split-screen implementation techniques that can allow a user to view and interact with the user interfaces of two or more applications simultaneously. Each of the two or more applications can be displayed within its own portion of two or more portions. A split-screen mode can be activated by a user by opening a split-screen application and selecting the applications to be used. Once within the split-screen mode, the user can customize the layout by adjusting the size of each portion and/or moving the application between the portions. Further, when within the split-screen mode, the user can share content from one application to another by selecting and dragging the content. The split-screen mode can also be implemented on a foldable device. The folding of the device can be used as a trigger to initiate split screen mode and the folding line can be used a border between portions.

20 Claims, 8 Drawing Sheets

(51) Int. Cl.
  *G06F 3/04817* (2022.01)
  *G06F 3/0482* (2013.01)
  *G06F 3/04845* (2022.01)
  *G06F 3/0486* (2013.01)
(52) U.S. Cl.
  CPC ........ *G06F 3/0482* (2013.01); *G06F 3/04845* (2013.01); *G06F 9/451* (2018.02); *G06F 2203/04803* (2013.01)
(58) Field of Classification Search
  CPC ........... G06F 9/451; G06F 2203/04803; G06F 3/0488; G06F 3/04886
  See application file for complete search history.

(56) References Cited

U.S. PATENT DOCUMENTS

| | | | | |
|---|---|---|---|---|
| 10,976,887 | B2* | 4/2021 | Hao | G06F 3/04886 |
| 11,042,284 | B2* | 6/2021 | Lee | G06F 3/0486 |
| 11,579,753 | B2* | 2/2023 | Lee | G06F 1/1652 |
| 11,714,520 | B2* | 8/2023 | Hwang | G06F 3/04886 |
| | | | | 715/780 |
| 2010/0138763 | A1* | 6/2010 | Kim | G06F 3/04842 |
| | | | | 715/810 |
| 2010/0248788 | A1* | 9/2010 | Yook | G06F 3/04817 |
| | | | | 455/566 |
| 2011/0107272 | A1* | 5/2011 | Aguilar | G06F 3/04883 |
| | | | | 345/173 |
| 2013/0187861 | A1* | 7/2013 | Lavallee | G06F 3/0486 |
| | | | | 345/173 |
| 2014/0164957 | A1* | 6/2014 | Shin | H04L 65/403 |
| | | | | 715/806 |
| 2014/0245203 | A1* | 8/2014 | Lee | G06F 3/04845 |
| | | | | 715/765 |
| 2014/0325431 | A1 | 10/2014 | Vranjes et al. | |
| 2014/0325433 | A1 | 10/2014 | Hiroura | |
| 2015/0067588 | A1* | 3/2015 | Shim | G06F 3/04886 |
| | | | | 715/781 |
| 2015/0169099 | A1 | 6/2015 | Lavallee | |
| 2015/0169216 | A1* | 6/2015 | Cho | G06F 3/0486 |
| | | | | 715/764 |
| 2017/0322709 | A1* | 11/2017 | Chen | G06F 3/04883 |
| 2017/0371530 | A1* | 12/2017 | Vranjes | G06F 9/542 |
| 2018/0039408 | A1* | 2/2018 | Cheong | G06F 3/0481 |
| 2019/0243516 | A1* | 8/2019 | Shim | G06F 3/0481 |
| 2019/0339855 | A1* | 11/2019 | Walkin | G06F 3/0485 |
| 2021/0011610 | A1* | 1/2021 | Hwang | G06F 3/0481 |
| 2021/0056878 | A1* | 2/2021 | Lee | G06F 3/041 |
| 2022/0269314 | A1* | 8/2022 | Chen | G06F 1/1677 |
| 2022/0308753 | A1* | 9/2022 | Song | G06F 3/0481 |

FOREIGN PATENT DOCUMENTS

| | | |
|---|---|---|
| CN | 109683837 A | 4/2019 |
| CN | 110362246 A | 10/2019 |
| CN | 110727382 A | 1/2020 |
| WO | 2019192498 A1 | 10/2019 |

OTHER PUBLICATIONS

Extended European Search Report dated Jan. 25, 2024 of European Application No. 20955030.0.
International Search Report Mailed Jun. 18, 2022 In App. No. PCT/CN2020/134602.
Written Opinion Mailed Jun. 18, 2021 In App. No. PCT/CN2020/134602.
Chinese Patent 1st Office Action dated Jul. 5, 2024 of Chinese Application No. 202080105428.6.

* cited by examiner

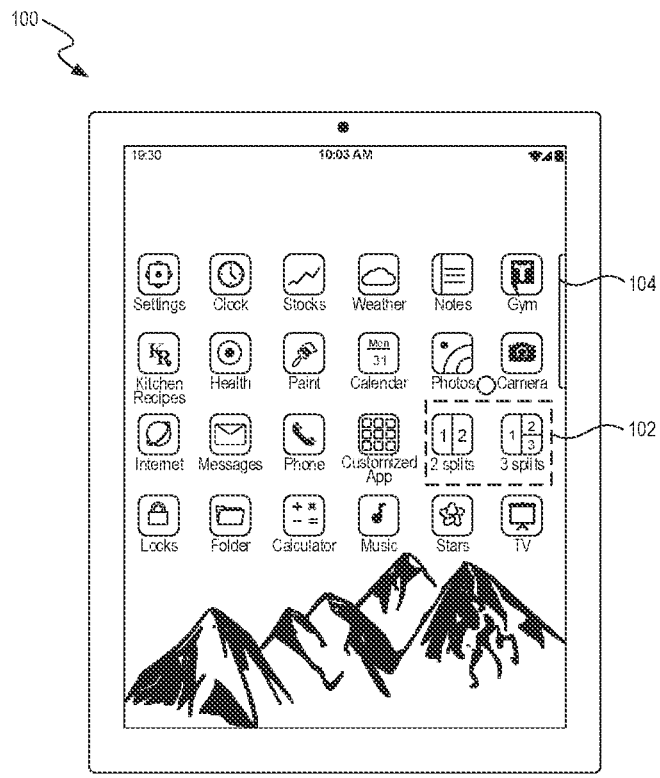
*FIG. 1*
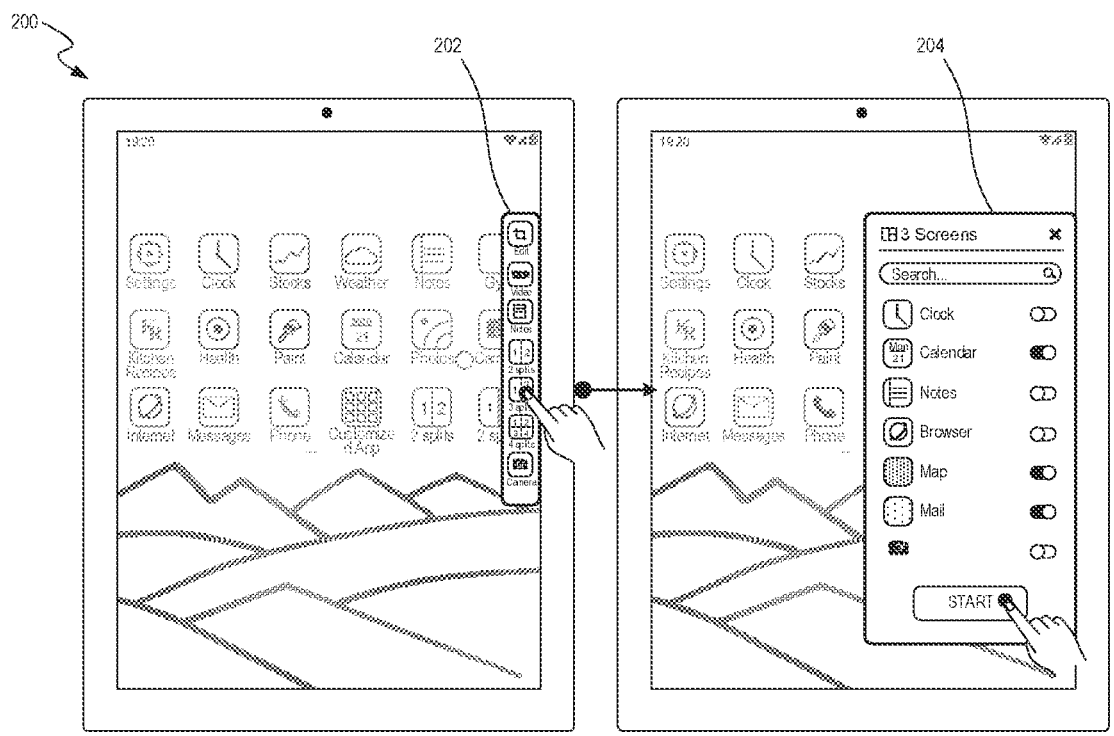
*FIG. 2A*  *FIG. 2B*

SPLIT-SCREEN DISPLAY IMPLEMENTATION IN COMPUTING DEVICE

CROSS-REFERENCE TO RELATED APPLICATION(S)

This application is a continuation application of PCT Patent Application No. PCT/CN2020134602, entitled "SPLIT-SCREEN DISPLAY IMPLEMENTATION IN COMPUTING DEVICE" filed on Dec. 8, 2020, which claims priority to U.S. Provisional Patent Application No. 63/081,746 filed on Sep. 22, 2020, entitled "SPLIT SCREEN IMPLEMENTATION FOR SOFTWARE APPLICATION," both of which are hereby incorporated by reference in their entireties.

TECHNICAL FIELD

This disclosure relates generally to a split-screen mode on a mobile user device, and more particularly, to techniques for displaying content from multiple applications within separate portion of a display of the user device.

BACKGROUND

On-screen time has exponentially increased over the recent decades. The increase in on-screen time can also be correlated to the increase in content available for viewing on a screen. In fact, many people have shifted from using other means to perform daily tasks to doing these tasks on a screen. For example, rather than visit a bank for regular transactions, people use applications associated with the bank to perform the same tasks.

Another key factor has been the increase in the size and quality of the screen. These improvements have again transformed traditionally in-person activities to on-screen activities. For instance, rather than going to a yoga studio for exercise, people can now take online classes, which are clearly visible on larger screens. Thus, the state of the technology has improved in a drastic manner and has caused the drastic shift to a dependence on screens for performing tasks.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

FIG. 1 illustrates an example of a display including variations of split-screen applications.

FIG. 2A illustrates an example of a menu where the split-screen applications are located on a display.

FIG. 2B illustrates an example the start-up menu of the selected split-screen application.

DETAILED DESCRIPTION

Figures 3A, 3B:
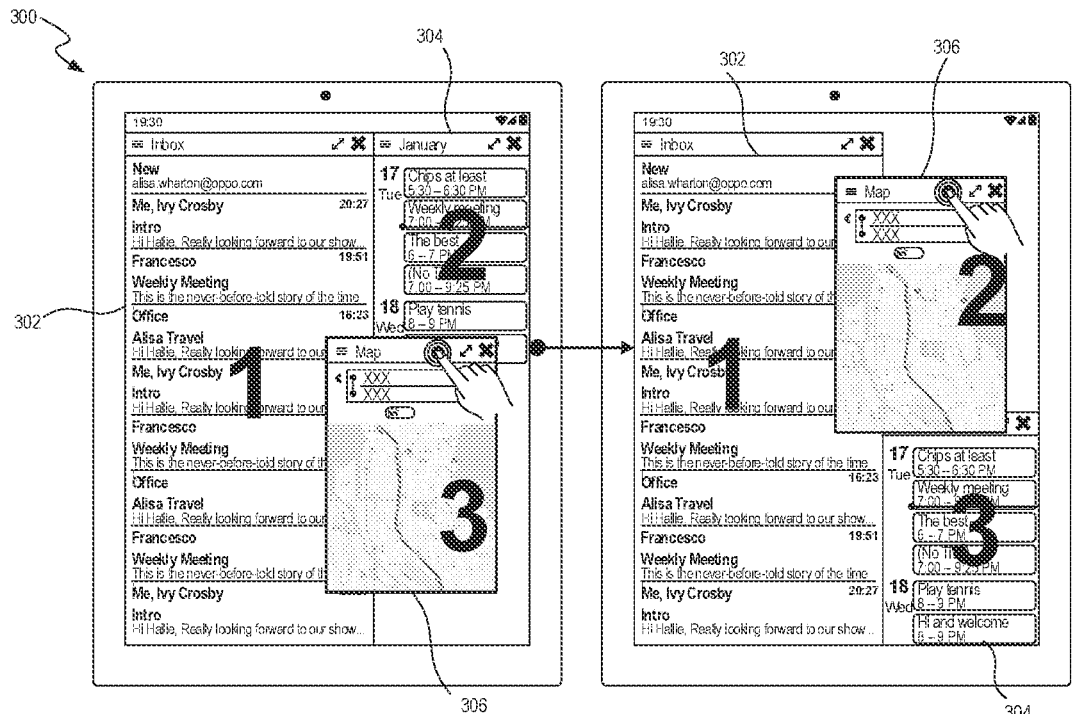
FIG. 3A illustrates an example of customization of the split-screen mode.
FIG. 3B illustrates the movement of applications within the split-screen mode.

References in this description to "an embodiment," "one embodiment," or the like, mean that the particular feature, function, structure, or characteristic being described is included in at least one embodiment of the present disclosure. Occurrences of such phrases in this specification do not necessarily all refer to the same embodiment. On the other hand, the embodiments referred to also are not necessarily mutually exclusive.

As mentioned above, on-screen time has drastically increased in recent years. The upward trend can, at least partially, be attributed to the increase in the functionality, available content, quality of screens, and sizes of screens of common mobile devices. Users have started using their devices for various everyday tasks such as banking, entertainment, reading, and other activities that previously didn't include on-screen time. For example, digital and audio version of books are now available through online bookstores.

In turn, this increase in on-screen time has prompted businesses to develop more content that enables users to complete more of their everyday activities on their devices. For instance, banks now have applications that allow online check deposit, transfers, and other activities that traditionally required a visit to the bank. In another example, newspapers and magazines were traditionally hard copies. Nowadays, they are application-based and simulate the sections of the hardcopy equivalent.

This increase in on-screen time has also raised issues. In general, users expect applications to simulate the traditional user experience. This can include, for example, simulating the capabilities available during a traditional experience, ability to multi-task, and ability to share content from one source to another. For instance, a traditional experience at a bank involves teller, a calculator, and a user's current bank balance statements. In order to simulate this experience on a device, the bank may develop an application through which a user can access their bank records. However, to perform a transaction, a user may need to access further applications such as a calculator or the user may need to call a customer service agent. Thus, in order to more closely simulate the traditional experience, a user likely needs to access multiple applications simultaneously.

In another example, a traditional yoga class can include an in person instructor, and music and/or videos. In some cases, the yoga instructor can be playing music, or the user can have their music or a video playing through headphones. An application-based version of the yoga class can include a video stream of the yoga instructor, which can include music in the background. However, to simulate the traditional experience and provide the user a choice of listening to their own music, the user must access a music streaming application or a video streaming simultaneously.

Another issue is the need to multi-task during on-screen time. In the current state of the art, a user is likely limited to operating one application at a time on a mobile device. However, often a user may want to perform multiple tasks at once. For example, a user may want to stream an exercise video and watch a TV show at the same time. In another example, while video chatting with a friend, a user may want to use a browser to search for restaurants nearby. Currently, in order to multi-task, a user has to open and close different applications at different times.

Another issue, which relates to the issue of simulating traditional experiences, is the need to share content from one source to another. Traditionally, if a user wanted to a share content from one source to another, the user can copy the content. For example, if a user wanted to copy a calendared event from a wall-hanging calendar to an email, the user can simply type out the calendared event while looking at the calendar. Thus, the user can double-check that the content is copied correctly. On a mobile device, this becomes more challenging because the user has to open the calendar application, try to remember the content of the calendared event, open the email application, and type out the content from memory. In some cases, the user may be able to use the copy and paste function; however, copy and paste becomes less useful when there is complex content (e.g., multimedia files).

Introduced here, therefore, are techniques for altering the display of a user device to display content from multiple applications simultaneously, while maintaining the functionality of the applications and allowing for sharing of content between the applications. More specifically, one or more embodiments of the disclosed techniques can include a split screen display mode which alters the display of a user device by partitioning the display into two or more portions and displaying content from each application in different portions of the two or more portions. The split-screen mode can be activated by, for example, opening a split-screen application on the user device. In some embodiments, the applications that will be displayed in the split-screen mode can be dragged near the icon of the split-screen application, selected from a menu once the split-screen application is opened, or saved as a preferred option.

In some embodiments, the number of portions (e.g., applications) can vary. For example, the user device can include one split-screen application that is designated for 2-way splits and another split-screen application for 3-way splits. In another example, the user device can include one split-screen application to enable split-screen mode. When the single split-screen application is opened, a start-up menu can prompt the user to select the number of portions or the number of applications to be displayed.

In the following description, some embodiments are described from a user-side portion of the split-screen application which is implemented as a smart application ("application"). For example, a user can download the split-screen application on their respective devices. However, the split-screen mode is not limited to being implemented as an application. For example, the split screen mode can be built into the operating system.

Further, in the following description, the example of a mobile device is used, for illustrative purposes only, to explain various aspects of the techniques. Note, however, that the techniques introduced here are not limited in applicability to mobile devices or to any other particular kind of devices. For example, other electronic devices or systems (e.g., a laptop or a tablet) may adapt the techniques in a similar manner.

Split-Screen Applications

FIG. 1 illustrates an example of a display 100 including variations of split-screen applications. Display 100 includes split-screen applications 102 and hidden menu 104. Split-screen applications 102 are an example of two applications, each with a default number of portions. In particular, one split-screen application has a default of two portions, and the other has a default of three portions. The defaults indicate to a user how many portions are available within the respective split-screen mode, which in turn indicates the number of applications that can be simultaneously viewed when the respective split-screen application is opened. For example, if the "2 splits" application is opened, a user can view two applications simultaneously.

Further, in some embodiments, the image representation of the split-screen application can indicate the default layout of the portions. For example, the "3 splits" icon is pictured as having one portion on the left half of the display labeled as "1", while the right half is split between portions "2" and "3". The pictured layout can be default layout of the split-screen application. However, in some embodiments, the user may be able to alter the layout. For example, the user may be presented with a menu of options of different three-split layouts to select from when the user opens the "3-splits" application. In another example, the user may be able to alter the size of the portions. For instance, the user can resize portion "1" to be identical to portion "2" and resize portion "3" to take up empty space caused by resizes portion "1".

Although FIG. 1 depicts the split-screen applications 102 as being located on the screen (e.g., home screen) of the display 100, the split-screen applications 102 can be located elsewhere. For example, the split-screen applications 102 can also be located in hidden menu 104. The hidden menu 104 can be hidden from view or can auto-hide itself over an edge, except for a small portion that is jutting out from the edge of the display 100. A user can view a large portion of the hidden menu 104 with, for example, a sliding gesture, tap, or other gesture near the hidden menu 104. Once a larger portion of the hidden menu 104 is visible, the split-screen applications 102 located within the hidden menu 104 can be visible to the user.

In some embodiments, a small portion of the hidden menu 104 can always be visible on display 100 and can be actuated. In other words, irrespective of the activity being displayed on the display 100, a small portion of the hidden menu 104 can be visible. Similarly, irrespective of the activity, a user can actuate the hidden menu 104 to view a larger portion of the hidden menu 104. For example, the user can be viewing a browser on display 100 and without having to close the browser and find the split-screen applications 102, the user can actuate hidden menu 104 to open one of the split-screen applications 102.

Accordingly, the split-screen mode can be activated by opening applications. Note, however, that although only two variations are shown in FIG. 1, other variations can be similarly utilized. For example, a four-portion split-screen application can be utilized with each portion being a fourth of the display 100. The four-portion split-screen application can have a default layout that splits the display 100 in halves in both the vertical and horizontal directions to create four portions. Moreover, although hidden menu 104 is illustrated as an example of another location to find split-screen applications 102, other locations are also possible. For example, another auto-hide menu can become visible due to a sliding gesture from the bottom of the display 100 and/or the top of the display 100. The split-screen applications 10 can also be located within said menu.

Menu for Starting Split-Screen Mode

FIG. 2A illustrates an example of a menu 202 where split-screen applications are located on a display 200. As mentioned above, the split screen applications can be located anywhere on a user device. Here, for example, the applications are located within a menu 202. In some embodiments, the menu 202 can be a partially hidden menu that is fully displayed when the user performs a gesture (e.g., a two-finger drag gesture). In FIG. 2A, the menu 202 is fully displayed and the user can select a split-screen application (e.g., 3-portion split). Once the user selects a particular split-screen application, a start-up menu can be populated, as in FIG. 2B.

FIG. 2B illustrates an example of a start-up menu 204. Start-up menu 204 can include prompts for the user to select, for example, the layout of the portions, the applications included in the split screen mode, a search bar for the user to search for applications on the device, and a start button to initiate the split-screen mode. In some embodiments, the start-up menu 204 can include a list of the applications that the user uses heavily, previously used in split-screen mode, and/or recently used. For example, in FIG. 2B, the user may have recently used the Clock application, and previously used the Notes application in a split-screen mode, and frequently used the Map application.

Once the user selects the applications to be used in the split screen mode, the user can select Start. In some embodiments, the user may be permitted to only select the amount of applications indicated by the split-screen application variation the user selected. For example, in FIG. 2B, the user has selected a three-portion variation, and thus, the user may select three applications. If the user attempts to select more or less than three, an error message may be displayed, which instructs the user to select the appropriate amount. Once the user selects the appropriate amount, the user can select Start to enter the split-screen mode.

Customization within Split-Screen Mode

FIG. 3A illustrates an example of customization of the split-screen mode 300. Slit-screen mode includes a first application 302, a second application 304, and a third application 306, displayed within three portions (e.g., 1, 2, and 3) of the display. Each application displays their respective user interface within different portions. For example, in FIG. 3A, the first application 302 is displaying its user interface within portion 1, the second application 304 is displaying its content with portion 2, and the third application 306 was displaying its content within portion 3 prior to the dragging gesture by the user.

The layout and sizes of portions 1, 2, and 3 can be altered in some embodiments. For example, a user can drag the bottom border of portion 1 upwards to align with the bottom border of portion 2. In another example, the size of the portions can be linked to the size of the applications displayed within the portion. For instance, the first application 302 is displayed with portion 1. A user can resize first application 302 using known methods such as dragging a border of the application, and in turn, portion 1 can be automatically resized.

In some embodiments, when a user resizes a portion and/or application, the other portions and/or applications can be automatically resized to fill the entirety of the display. For example, if a user resizes portion 1 to be the same size as portion 2, portion 3 can resized to fill the newly created space. Similarly, if the user enlarges portion 2, portion 1, portion 3, or both can be automatically resized such that the portions do not overlap.

Once the applications 302, 304, and 306 are displayed within portions 1, 2, and 3, respectively, a user has a choice of moving them. For example, FIG. 3A illustrates the user grabbing (e.g., long press) third application 306 and moving it. In some embodiments, when a user drags an application near another portion and/or application (e.g., portion 2 and second application 304), the other portion and/or application can be automatically relocated to the portion where the application being dragged was previously located. For example, in FIG. 3A, user has dragged third application 306 from portion 3 near second application 304 and portion 2.

FIG. 3B illustrates the movement of applications within the split-screen mode 300. As the user drags third application 306 near portion 2, second application 304 is automatically relocated into portion 3, leaving portion 2 empty. The user can then place third application 306 into portion 2. In some embodiments, automatic resizing can occur when an application is relocated to a differently sized portion. For example, if the user dragged third application 306 from portion 3 to portion 1, third application 306 can be automatically resized to the size of portion 1 and first application 302 can be automatically resized to fit into portion 3.

The user can activate such relocation capabilities by using other common gestures. For example, the user can tap a heading bar of an application or perform a long press elsewhere on the application. In another example, the user may flick the application towards a portion to activate the relocation. For instance, the user can use one or more fingers to press and flick third application 306 towards portion 2. By doing so, second application 304 and third application 306 can switch locations.

Figures 4A, 4B:
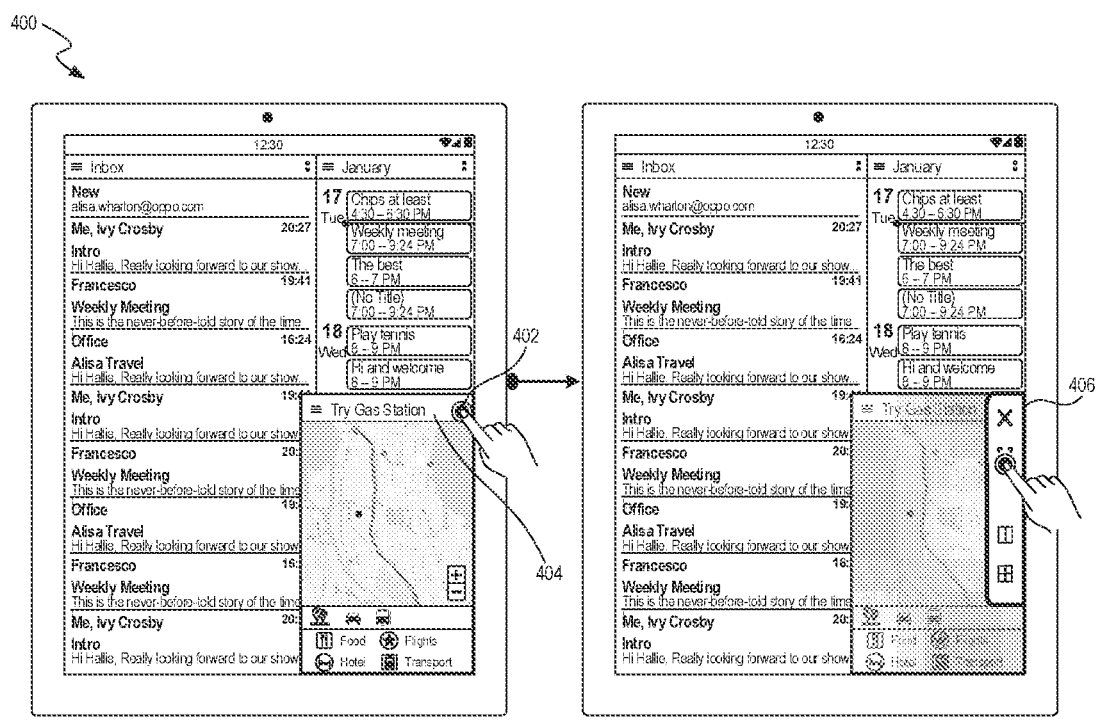
FIG. 4A illustrates an example of a location of the prompt to populate a menu within the split-screen mode.
FIG. 4B illustrates an example of a menu within the split-screen mode.

FIG. 4A illustrates an example of a location of a prompt to populate a menu within the split-screen mode 400. Split-screen mode 400 includes prompt 402, heading bar 404, and menu 406. The prompt 402 can be located on the heading bar 404 of an application. In some embodiments, the heading bar 404 can include similar options and a title for every application within split-screen mode 400. For example, the heading bar 404 can include a title for the application (e.g., Inbox) and a prompt 402.

The prompt 402 can be triggered by common gestures such as a regular press near or on the prompt 402. Once prompted, a menu 406 is populated. FIG. 4B illustrates an example of the menu 406 within the split-screen mode 400. The menu 406 can include various options related to the split-screen mode. For example, the menu 406 includes options to close the application, open a new application, resize (e.g., expand) the application, and to enter a different split-screen mode.

Moreover, some of the options within the menu 406 may only impact the respective application, while other options may impact the entire split-screen mode 400. For example, if a user chooses to expand the application, the entire screen can display only that particular application. Alternatively, if the user chooses to close the application, only the selected application can be closed (e.g., removed from split-screen mode 400). Similarly, if the user selects enter a different variation of the split-screen mode, the entire current display can be modified to reflect the change. For example, in FIG. 4B the current display includes three portions. If the user selects to enter a two-portion split-screen, the user can be prompted to select one application to close, and the display can be altered to display the remaining two applications in equal portions of the display.

Figures 5A, 5B:
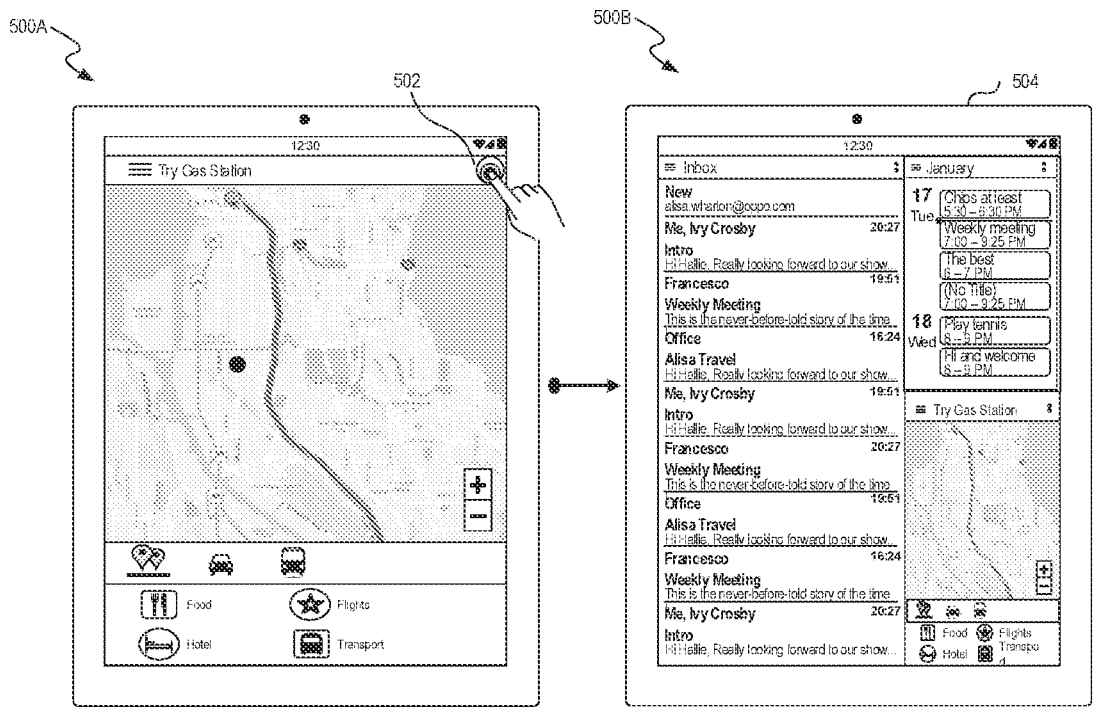
FIG. 5A illustrates an example of the full-screen mode.
FIG. 5B illustrates an example of the split-screen mode after exiting the full-screen mode.

FIG. 5A illustrates an example of the full-screen mode 500A. Full-screen mode 500A includes exit prompt 502. As described in conjunction with FIG. 4B, when a user chooses to expand an application, the application can be resized to the fit the entirety of the display. Once in the full-screen mode 500A, a user can choose to exit full-screen mode 500A. FIG. 5B illustrates an example of the split-screen mode 500B after the user chooses to exit the full-screen mode 500A. When a user chooses to exit full-screen mode 500A, the display can return to the split-screen mode 500B, which includes the same applications and layout that was previous displayed. For example, if the user chooses to enter full-screen mode 500A from a three-split mode, the user will be returned to the same display after exiting full-screen mode 500A.

Content Sharing

Figures 6, 7:
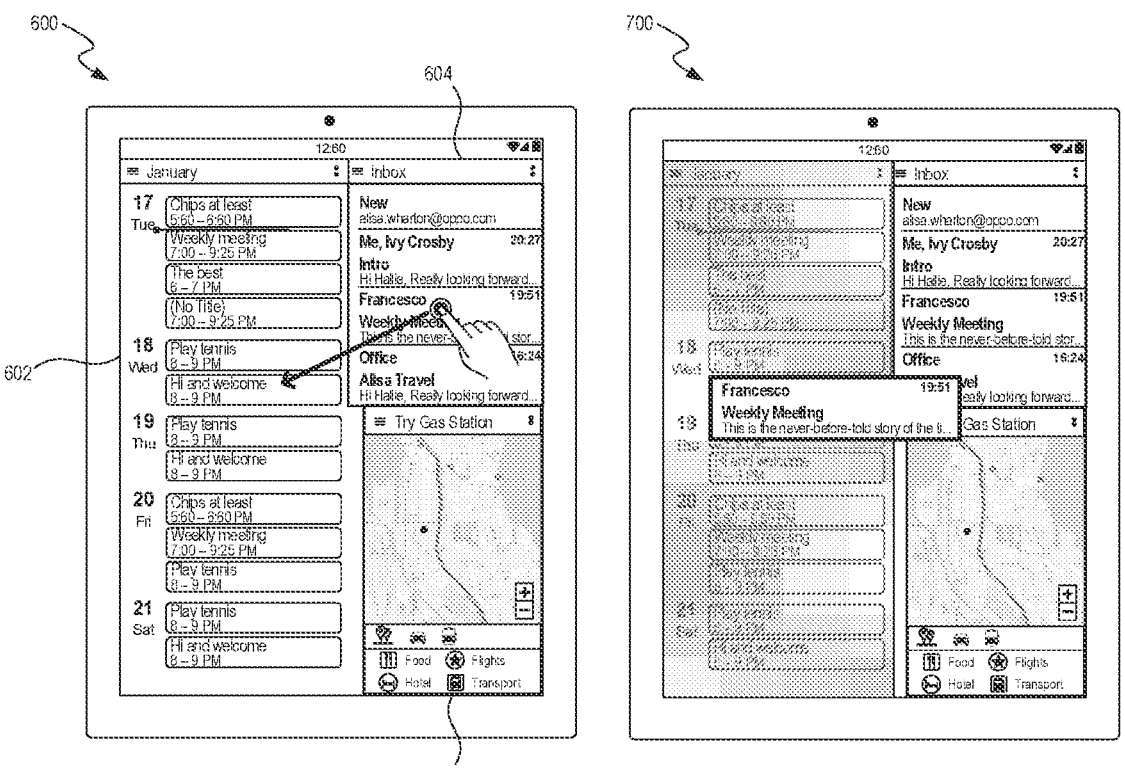
FIG. 6 illustrates an example of content sharing within the split-screen mode.
FIG. 7 illustrates another example of content sharing within the split-screen mode.

FIG. 6 illustrates an example of content sharing within the split-screen mode 600. Split-screen mode 600 includes calendar 602, email 604, and maps 606. In some embodiments, a user can transfer content from one application within split-screen mode 600 to another application within split-screen mode 600. The content can include any data associated with an application. For example, the content can be numeric, text, multimedia, and/or metadata. For instance, a calendar invite for a weekly meeting within email 604 can be dragged and dropped into the calendar 602.

In some embodiments, the user may be prompted to choose how shared content should be incorporated into the destination application. For example, if the user drags a map from maps 606 into calendar 602, the user may be prompted to select whether the map should be stored in new calendar event as the location for the event. In another example, if the user drags the map from 606 into email 604, the user may be prompted to select how to proceed. The next step may include, for example, opening a new email window or adding the map as an attachment to an email. In some embodiments, a default method can be selected during the first exchange between two applications. For example, in FIG. 6, if this was the first instance of sharing between email 604 and calendar 602, the user may be prompted to select a default action for future instances. The user may be prompted to select from multiple options, such as adding the content to an existing calendar event or making a new calendar event.

Once the content is dropped at the destination, the appearance of split-screen mode 600 can change to indicate that the destination has received the content. FIG. 7 illustrates the change in split-screen mode 700 when content is dropped at the destination. For example, the destination can change colors to highlight the shared content or the destination can change sizes to indicate receipt of the content.

Figure 8:
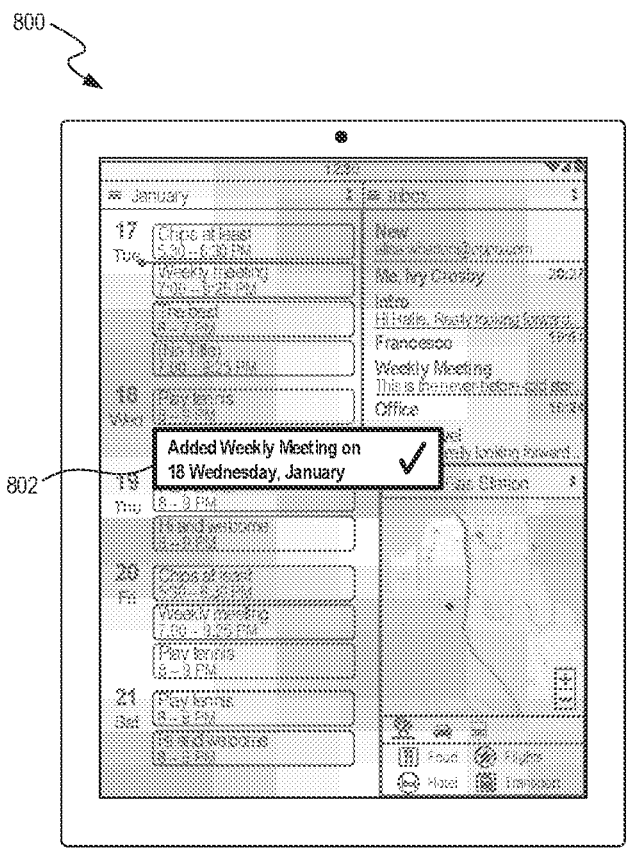
FIG. 8 illustrates an example of an alert generated when content from one application is shared to another.

FIG. 8 illustrates an example of an alert 802 on display 800 when content from one application is received by another application. In some embodiments, the alert can include an indication that the content was successfully transferred. For example, the alert 802 can include a snippet of the content and a check mark. In some embodiments, if the shared content was not successfully transferred, alert 802 can include, for example, a "X" or can prompt the user to try again.

Split-Screen Icon Appearance

Figures 9A, 9B, 9C:
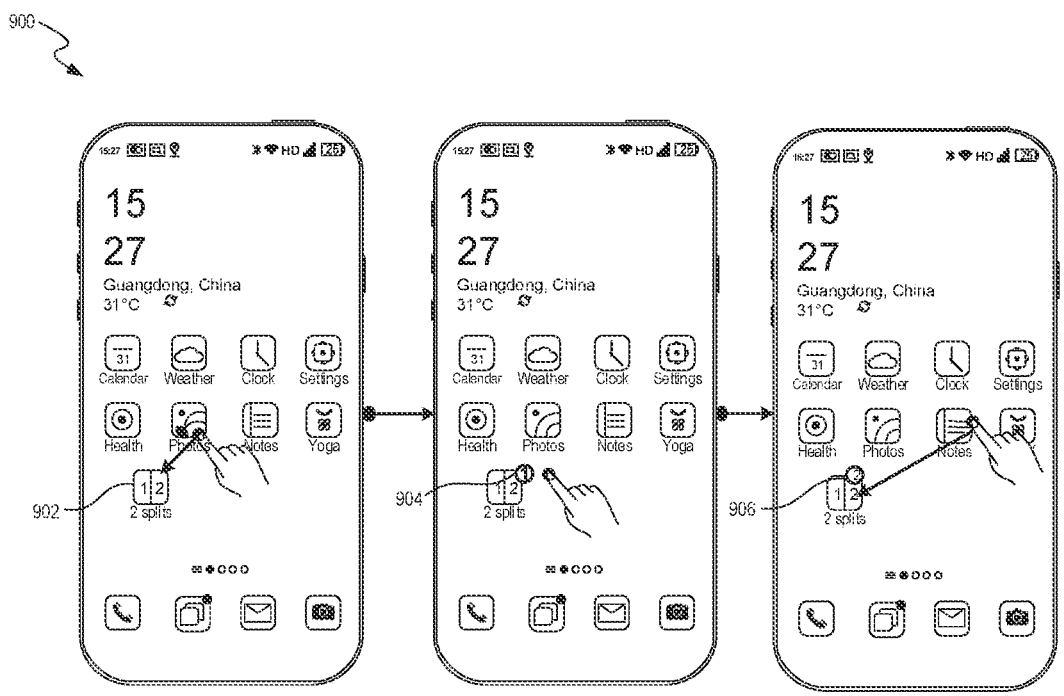
FIG. 9A illustrates an example of how the content displayed within the split-screen mode is selected from the home screen of a user device.
FIG. 9B illustrates an example of the updated appearance of the split-screen application icon on the home screen of a user device.
FIG. 9C illustrates another example of how the content displayed within the split-screen mode is selected from the home screen of a user device.

FIG. 9A illustrates an example of how the content displayed within the split-screen mode is selected from the home screen 900 of a user device. Home screen 900 includes 2-splits icon 902. In some embodiments, a user can select and drag another application (e.g., Photos) near the 2-splits icon 902 to use the other application in a split-screen mode. Once the other application is dropped on or near the 2-splits icon 902, the user can receive an indication that the other application will be displayed when the split-screen mode is activated. In some embodiments, as shown in FIG. 9B appearance of the split-screen application icon can be updated with indicator 904.

For example, the indicator 904 can populate on an edge of the 2-splits icon 902 and indicate the number of applications that will be displayed if the split-screen mode was activated. For example, in FIG. 9B, the user has dragged one application (e.g., Photos) for use in the split-screen mode. Thus, the indicator 904 shows "1". Once another application (e.g., Notes) is dragged and dropped near or over 2-splits icon 902, the indicator can reflect the change.

For example, FIG. 9C illustrates another example of how the indicator is updated after another application is selected. In particular, updated indicator 906 recites, "2", after the Notes application is dragged and dropped near or over the 2-splits icon. In some embodiments, once the maximum number of applications have been selected, the user may not be able to drag and drop any other applications. For example, the split-screen mode that is activated when 2-splits icon 902 is opened can have a maximum of two applications that can be displayed simultaneously. Thus, if a user attempts to drag and drop a third application, the action may not be accepted. In some embodiments, the user may be prompted to elect to remove an application if the user selects more than maximum number. For example, in FIG. 9C, if the user attempts to drag and drop the Health application near or over the 2-splits icon, the user may be prompted to remove either the Photos or the Notes application.

Starting Split-Screen Mode and Saving Preferences

Figures 10A, 10B, 10C:
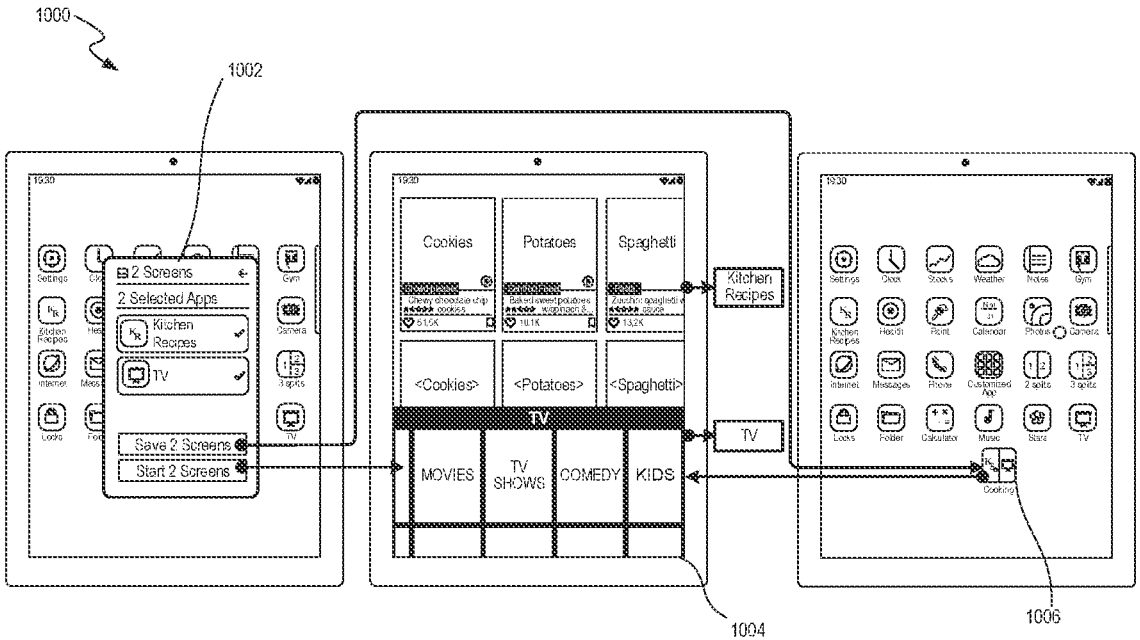
FIG. 10A illustrates an example of the initial menu when the split-screen mode is activated.
FIG. 10B illustrates an example of the split-screen mode when the user selects "start 2 screens".
FIG. 10C illustrates an example of the updated appearance of the split-screen application icon when the user selects "save 2 screens".

FIG. 10A illustrates an example of the opening menu 1002 when the split-screen mode is activated on display 1000. Opening menu 1002 can be populated when a user activates (e.g., clicks on) on a split-screen application. Opening menu 1002 can include, for example, options for the user to select the number of portions, the applications to be viewed within a split-screen mode, and/or to proceed by saving or starting the split-screen mode.

In some embodiments, the user can select the number of portions. For example, in FIG. 10A, the user has elected to have two screens (e.g., portions). In another example, the user can select a different number of portions using a drop down menu. Once the number of portions is selected, the user can select the applications to use within the split-screen mode by using, for example, a drop-down menu or a list of applications (e.g., similar to start-up menu 204). As mentioned before, the maximum number of applications that can be selected can be the same as the number of selected portions. If the user selects more or fewer applications than the number of portions, the user can be prompted to edit the choices.

After selecting the applications, the user can elect to either start the split-screen mode or save the selection as a default. FIG. 10B illustrates an example of the split-screen mode when the user selects "start 2 screens". In some embodiments, when the user elects to start the split screen mode, the choices that the user made in the opening menu 1002 are reflected in the split-screen display 1004. In FIG. 10B, for example, the application "Kitchen Recipes" and "TV" are displayed simultaneously in split-screen display 1004.

Alternatively, the user can elect save the selections as a default. FIG. 10C illustrates an example of the updated appearance of the split-screen application icon when the user selects "save 2 screens". In some embodiments, when the user elects to save the 2 screens, the choices that the user made on opening menu 1002 can be saved as a default or preferred option. In other words, every time the split-screen application is opened, it can reflect the choices made on opening menu 1002 (e.g., split-screen display 1004).

In some embodiments, a customized icon can be generated when the user elects to save the selections on opening menu 1002. The option to save allows a user to generate multiple applications for each preference. For example, icon 1006 is labeled "cooking", which can indicate that the user prefers the split-screen display 1004 when they are cooking. In another example, the user can save different preferences for each activity such as working out or reading. For instance, rather than "Kitchen Recipes" and "TV", the user can save "Health" and "Music" as a default for when the user is working out.

The appearance of the customized icon can include a collage of the visual cues associated with the chosen applications. For example, in FIG. 10C, the icon 1006 can be the customized icon that is generated based on the user's selections. The user's selections, as shown in FIG. 10A, are a kitchen recipes application and a TV application. FIG. 10A also depicts a collage of visual cues representing each of the selected applications. The visual cues can be incorporated into the appearance of the icon 1006. In this case, the left side of the icon 1006 includes the visual cue associated with the kitchen recipe application and the right side of the icon 1006 includes the visual cue associated with the TV application. Similarly, when a different number of applications are selected, a customized icon can be generated with an icon which includes the visual cues associated with the selected applications. For example, when four applications are selected, the newly generated customized icon can be split into quadrants, each of which include a visual cue associated with one of the four selected applications.

In certain implementations, the customized icon can be a shortcut that has an appearance of an application and can automatically launch the split screen modes (in the manners described here) with the applications the user selects as the default. For example, if user selects icon 1006, the system can open the split screen mode depicted in FIG. 10B. In other words, each time icon 1006 is actuated, the corresponding split screen mode will include the selected applications. In FIG. 10B, the user has elected to save a split screen display with the kitchen recipes application and TV application. Thus, when icon 1006 is actuated, the corresponding split screen mode will include the kitchen recipes application and TV application.

Figures 11A, 11B:
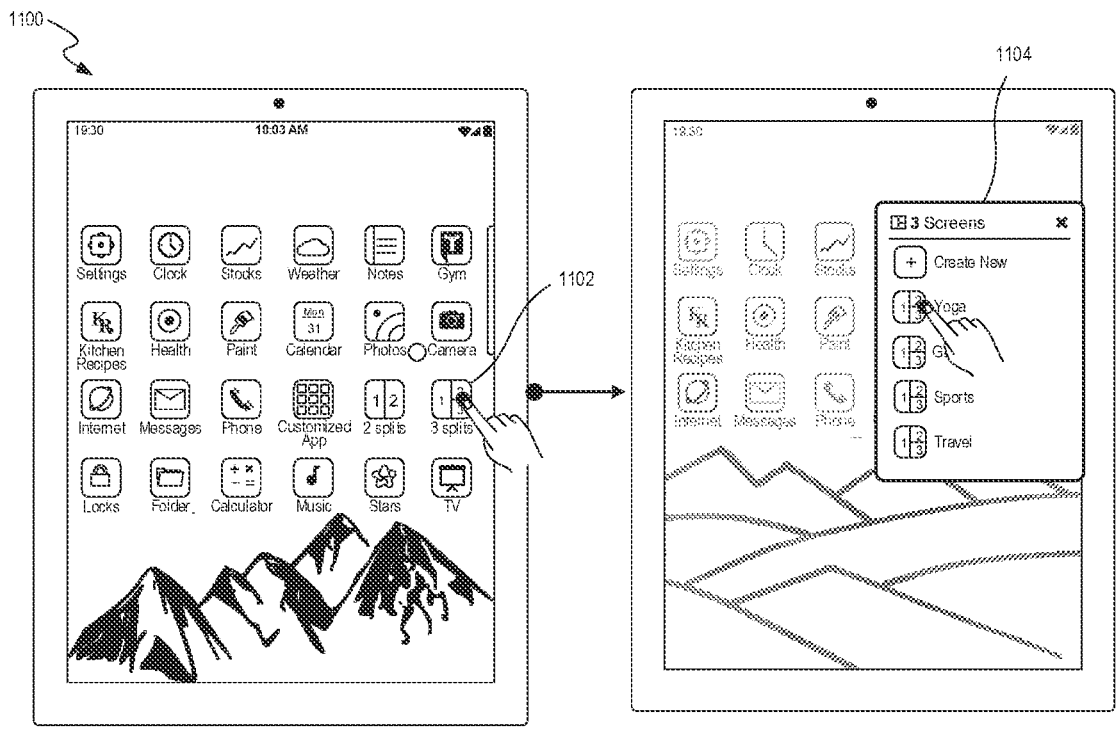
FIG. 11A illustrates an example of a display with multiple split-screen applications.
FIG. 11B illustrates an example of a saved preferences menu.

FIG. 11A illustrates an example of a display 1100 with multiple split-screen applications. Display 1100 includes 3 splits icon 1102. In some embodiments, when the user selects the 3 splits icon 1102, user may be prompted to select from a list of previously saved preferences for the split-screen display. FIG. 11B illustrates an example of a saved preferences menu 1104. Saved preferences menu 1104 includes a list of the user's previously saved split-screen layouts and applications. For example, the user has several previously saved preferences (e.g., yoga, sports, and travel). In some embodiments, the user can also elect to create a new preference. If the user selects this option, the user may be prompted to choose layouts and applications in a different menu (e.g., similar to start-up menu 204 and opening menu 1002).

Figure 12:
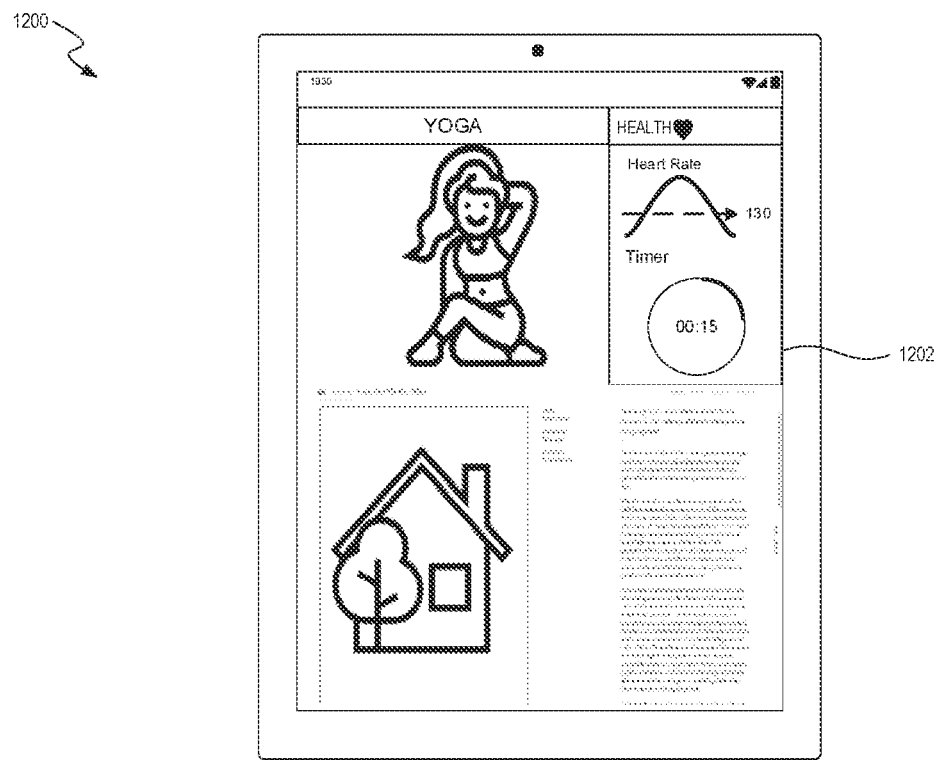
FIG. 12 illustrates an example of split-screen mode display of a saved preference.

Once the user selects a preference, the split-screen mode of that preference can be displayed. FIG. 12 illustrates an example of split-screen mode display 1200 of a saved preference 1202. A user may have, for example, selected the "yoga" preference. Thus, the display 1200 includes a yoga video, health application, and a digital book. If the user had selected another preference, the applications, the layout, the number of splits, and other factors may be changed to reflect the preferences.

Layouts

Figures 13A, 13B, 13C:
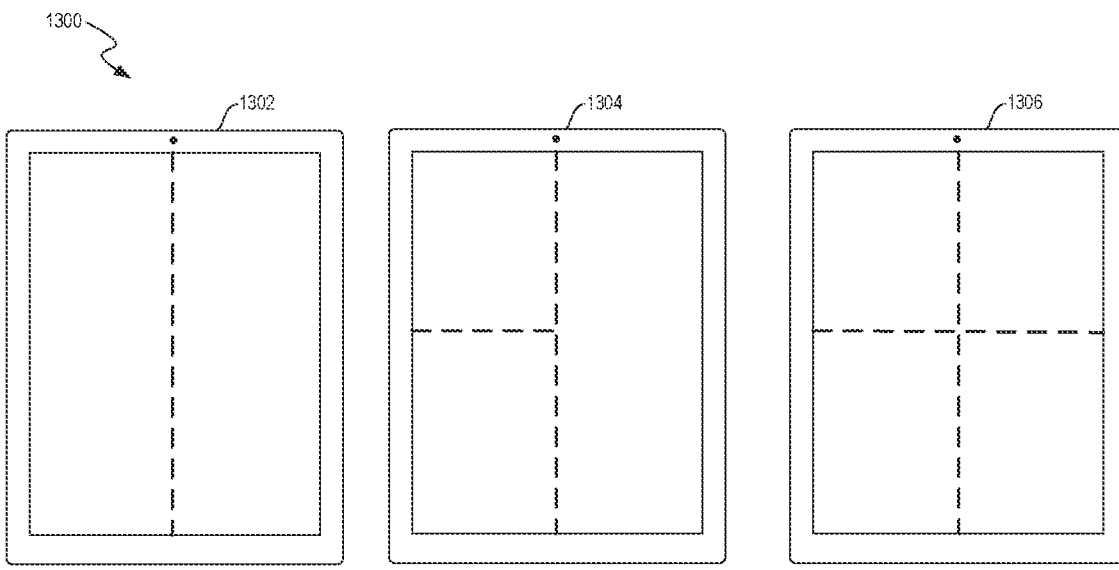
FIG. 13A illustrates an example of a layout of a two-way split screen mode.
FIG. 13B illustrates an example of a layout of a three-way split screen mode.
FIG. 13C illustrates an example of a layout of a four-way split screen mode.

In general, the layouts of split-screen modes can be altered and resized as the user prefers. The number of portions within the split-screen mode can dictate how many applications can be used. For example, a two-way split cannot accommodate more than two applications. FIG. 13A illustrates an example of a display 1300 with a layout of a two-portion split screen mode 1302. In some embodiments, the two-portion split screen mode 1302 can be split horizontally such that the top half of display 1300 is one portion and the bottom is another portion. In some embodiments, the size of each portion can be altered by, for example, clicking and dragging the border of a portion.

Similarly, FIG. 13B illustrates an example of a layout of a three-portion split screen mode 1304. As mentioned before, the three-portion split screen mode 1304 can be altered. For example, the largest portion can be located at the top of the display 1300 or the left side of the display 1300. In some embodiments, the display 1300 can be vertically or horizontally split into three equal portions. For example, each of the three portions can stretch from the left side to the right side of the display 1300 such that each portion is below or above another portion.

FIG. 13C illustrates an example of a layout of a four-portion split screen mode 1306. Four-portion split screen mode 1306 can also altered and resized as preferred. For example, the portions can be stacked on top of each other or adjacent to each other. In another example, the vertical border between the left side of the display 1300 and right side of the display 1300 can be moved to make two portions larger than the other two portions. Similarly, the horizontal border can be moved to make the top two portions larger or smaller than the bottom two portions.

Foldable Phone

Figure 14:
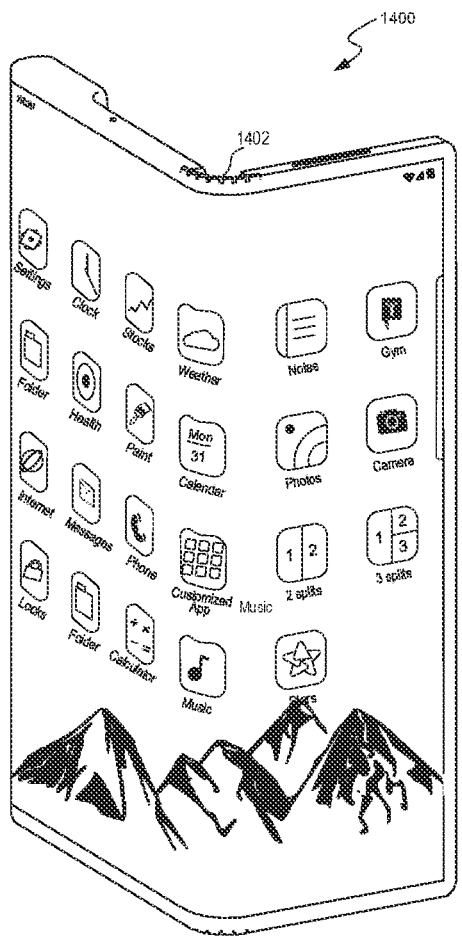
FIG. 14 illustrates an example of a foldable phone.

FIG. 14 illustrates an example of a foldable phone 1400. In some cases, the techniques disclosed herein can be implemented on a foldable phone 1400 with folding joint 1402. In some embodiments, folding joint 1402 can be used as a partition between portions of the split-screen mode. For example, in a two-portion split screen, the folding joint 1402 can form a folding line stretching vertically downward from the folding joint 1402. The folding line can provide for a first portion on the left of the screen and a second portion on the right of the screen.

In some embodiments, the degree at which the foldable phone 1400 is folded can impact the split-screen mode. For example, if the foldable phone 1400 is folded such that the user can view the entirety of the screen without having to turn the phone, the split-screen mode can be displayed across the entirety of the screen. Conversely, if the foldable phone 1400 is folded such that the one side of the foldable device is in contact with the other side, the split-screen mode may only display on one side. For example, if a user is holding the foldable phone 1400 and folds it completely, one side of the screen can be resting against the user's palm, while the other side of the screen is facing the user. Thus, the split-screen mode can be displayed on the side facing the user.

In some embodiments, user preferences can dictate the layout of the split-screen mode on foldable phone 1400. For example, the user can save preferred layouts (e.g., using saved preferences menu 1104) for use on the foldable phone 1400. The preferences can be based on the activity, for example. A user can save a preference called "Laptop", where the foldable phone 1400 is folded to mimic a laptop. In the "Laptop" layout, the user may have a keyboard application displayed on one half the screen and a notes application on the other half. Similarly, the user may have another preference labeled "Gaming", where one half of the screen has a video game controls (e.g., arrows keys) and the other half of the screen displays a game.

In some embodiments, actuation of the folding joint 1402 can be used as a trigger to initiate split-screen mode. For example, when the user folds foldable phone 1400, the user can be prompted to select from options as described in conjunction with start-up menu 204 and/or opening menu 1002. Accordingly, the split-screen mode described herein can be implemented on a foldable phone 1400.

Example System Components

Figure 15:
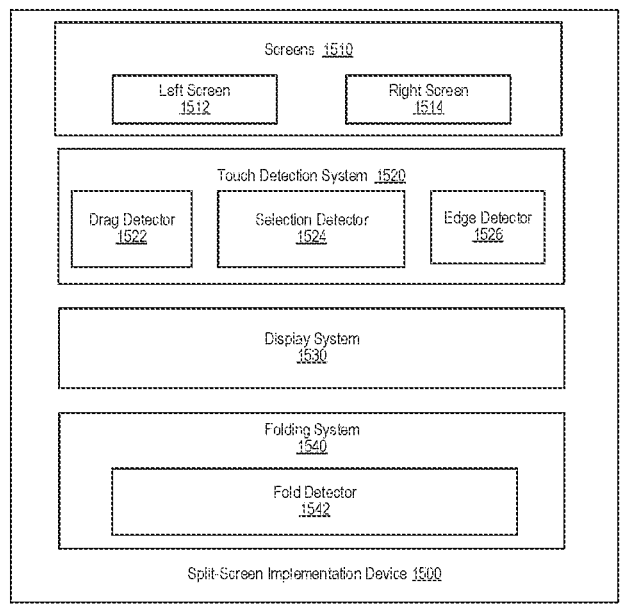
FIG. 15 illustrates a functional block diagram of an example device that can be utilized to implement the split-screen mode.

FIG. 15 illustrates a functional block diagram of an example split-screen implementation device 1500 that can be utilized to implement the split-screen techniques introduced here.

The exemplary split-screen implementation device 1500 can be implemented in and run on a mobile device of a user (e.g., foldable phone 1400). As illustrated in FIG. 15, the split-screen implementation device 1500 can include screens 1510, touch detection system 1520, display system 1530, and folding system 1540. Note that the components shown in FIG. 15 are merely illustrative; certain components that are well known, e.g., central processor units (CPUs), memory modules, and communication circuitry, are not shown for simplicity. Note that one or more systems, subsystems, components, and/or modules introduced here may be implemented as or include a software application; however, any suitable combination of these systems/subsystems/modules could be implemented as a hardware or a firmware component to achieve the same or similar functions. Similarly, example components in FIG. 15 are shown for purposes for facilitating the discussion herein; more or fewer components may be used, and components may be combined or divided, depending upon the actual implementation.

According to some embodiments, the split-screen implementation device 1500 can start when it receives an indication that the user wants to start split-screen mode. In some embodiments, an application programming interface (API) can be implemented for the device 1500 such that it can receive a software function call (e.g., from a software application) as an instruction. In some embodiments, the device 1500 can be implemented as a part of a function set provided by the operating system (OS), or in a system software library, etc. In some embodiments, the device 1500 can be a standalone software residing in the memory.

Once the device 1500 receives the indication to start split-screen mode, the device 1500 determines the next steps. In general, the next steps, as introduced here, can depend on the type of indication provided by the user. In some embodiments, the next steps can include generating a menu (e.g., start-up menu 204, opening menu 1002, or saved preferences menu 1104). In some embodiments, the next steps can include displaying a saved layout as illustrated in FIG. 12.

The touch detection system 1520 can provide the details of the type of instruction the user provided. The touch detection system 1520 can detect which part of the screens 1510 the user touched or selected. Depending on where the user made contact, device 1500 can determine the next steps. In particular, selection detector 1524 can determine when a user made a selection. Drag detector 1522 can determine when a user clicks and drags content. Edge detector 1526 can detect use activity and content near the edge of the screen (e.g., hidden menu 104).

In general, the display system 1530 can analyze data from the touch detection system 1520 to generate appropriate instructions to display content on screens 1510. For example, if the device 1500 determines that a menu should be displayed based on where the user made contact, the display system 1530 can generate instructions to display the menu on screens 1510. In another example, if the user contacted an area of the screen 1510 near a split-screen application (e.g., split-screen applications 102), the device 1500 can instruct display system 1530 to generate a menu. Alternatively, if the user selected a saved layout (e.g., icon 1006), the display system 1530 can generate the saved layout. In another example, if the drag detector 1522 detects that a user dragged an application near a split-screen icon, the device 1500 can instruct display system 1530 to change the appearance of the icon to include an indicator (e.g., indicator 904)

The folding system 1540, which is part of a foldable device, can be used to provide inputs to device 1500. The folding detector 1542 can detect when a user folds the folding device. The data from the folding system 1540 can be used, for example, to determine how the split-screen mode will be displayed. For example, fold detector 1542 can provide data that the user has folded a folding device such that one portion of the device is not visible to the user. The folding system 1540 can provide this data to the device 1500. In turn, the device 1500 can instruct the display systems 1530 to change display such that only the portion of the screens 1510 that is visible to the user is displaying the split-screen mode. For instance, the folding system 1540 can determine that only right screen 1514 or only the left screen 1512 is visible to the user, and thus, display system 1530 can provide instructions accordingly.

Methodology

Figure 16:
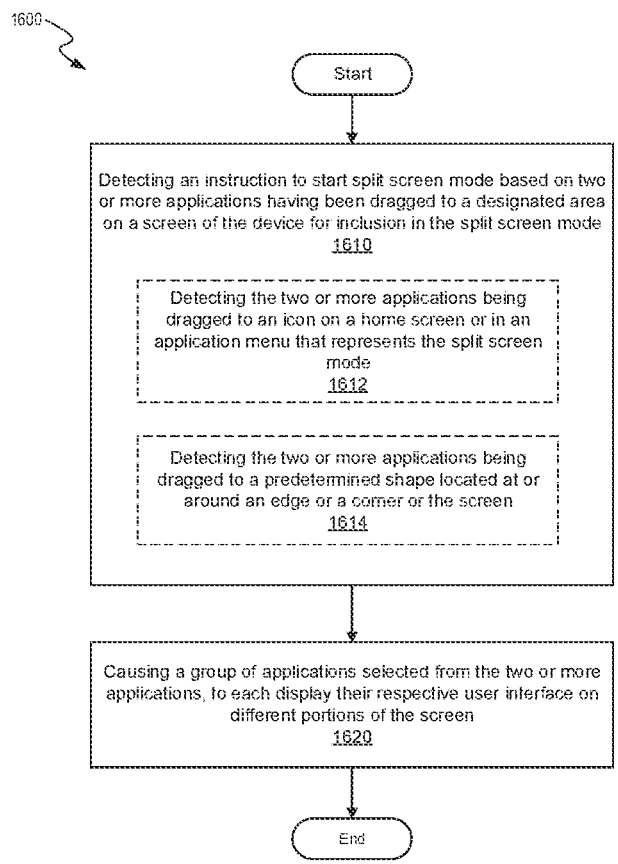
FIG. 16 illustrates a flowchart showing an example method for implementing the split-screen mode.

FIG. 16 illustrates a flowchart showing an example method 1600 for implementing the split-screen mode. The method 1600 can be implemented by various components of a device (e.g., split-screen implementation device 1500) which can execute instructions based on user input to adapt a screen of the device to display content. For instance, the device can be any device which includes a processor and a memory having instructions thereon that are executable by the processor.

First, at block 1610, the device can detect an instruction to start split-screen mode based on two or more applications having been dragged to a designated area on a screen of the device for inclusion in the split screen mode. In some embodiments, the designated area on a screen of the device can be an icon on a home screen or an application menu that represents the split screen mode, as in block 1612. In another example, in block 1614, the predetermined shape can be located at or around an edge or a corner of the screen (e.g., hidden menu 104). In some embodiments, when the device is a foldable device, the detection of the instruction to start split screen mode can be based on a folding action of the foldable device.

Further, once the device detects that an application has been dragged to the designated area, the device can display an interface with at least two icons, each representing a different variant of the split screen mode, so as to allow the user to choose a desirable variant. Each variant of the split screen mode can have a different number of display portions for the split screen display. For example, the available variants of the split screen mode can include a first variant having two display portions for the split screen display, and a second variant having three display portions for the split screen display.

Next, at block 1620, in response to the instruction to start the split-screen mode, the device can cause a group of applications selected from the two or more applications, to each display their respective user interfaces on different display portions of a screen of the device. The display portions can, for example, be based on the location of a folding line of a foldable device such that one display portion is separated from a neighboring displaying portion by the folding line. In some embodiments, upon receiving the instruction to start a split-screen mode and prior to causing each application to display their user interface, the device can trigger a user selection interface to be displayed on the screen, wherein the user selection interface prompts the user of the device to select, among the two or more applications, which ones are to be included in the group of application. The user selection interface can, for example, be triggered when a predetermined amount of applications has been dragged to a designated area. For instance, the predetermined amount can be two or three, or can be based on the split-screen application variation (e.g., split-screen applications 102).

In some embodiments, once the device detects that the user has selected a group of applications, the device can prompt the user to save the group of applications as a default group. If the user does elect to save the group of applications as a default, the device, in some examples, can generate a customized icon. The appearance of the customized icon can include a collage of visual cues representing each of the applications within the group of applications (e.g., as in icon 1006 in FIG. 10C). Further, when the user actuates (e.g., opens) the customized icon, the device can display the group of applications in split screen mode.

In some embodiments, a user can provide input which includes a desirable change in size, shape, and/or location for one display portion. As a result, the one display portion can be adjusted based on the input. In some embodiments, the input includes changing the one display portion to enter or exit full screen. In some embodiments, the input includes a drag of a split screen line, which separates the one display portion from a neighboring display portion. Based on the dragging of the split screen line, the device can adjust the neighboring display portion to complement how the one display portion is adjusted. In some embodiments, the input includes dragging a first display portion and dropping thereof onto a second display portion. In turn, the device can switch the location and the size of the display between the first and second display portions.

In some embodiments, the device can receive, from the user, a drag of an item from a first display portion to a second display portion, where each display portion corresponds to a different application. And in response to the dragging of the item the device can cause an application associated with the first display portion to convey information about the item to another application associated with the second display portion. The conveyed information about the item includes a specific location identifying where the item was dropped inside the second display portion. Further, the device can detect a drag action being performed on a designated area so as to enable the user to adjust a location of the designated area with respect to the screen.

Computer System and Device Architecture

Figure 17:
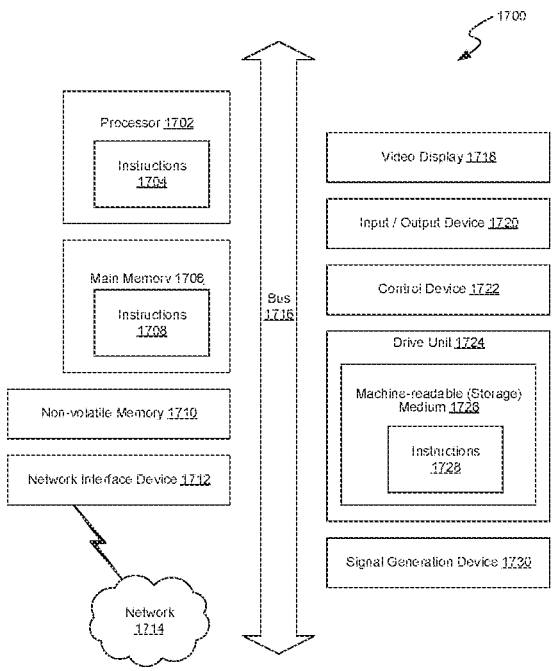
FIG. 17 illustrates a high-level block diagram showing an example of a mobile system in which at least some operations related to the techniques introduced here can be implemented.

FIG. 17 is a block diagram illustrating an example of a computing system 1700 in which at least some operations described herein can be implemented. For example, some components of the computing system 1700 utilized to implement a computing device (e.g., foldable device 1400 of FIG. 14) that includes a split-screen implementation device (e.g., split-screen implementation device 1500 of FIG. 15).

The computing system 1700 may include one or more central processing units (also referred to as "processors") 1702, main memory 1706, non-volatile memory 1710, network adapter 1712 (e.g., network interface), video display 1718, input/output devices 1720, control device 1722 (e.g., keyboard and pointing devices), drive unit 1724 including a storage medium 1726, and signal generation device 1730 that are communicatively connected to a bus 1716. The bus 1716 is illustrated as an abstraction that represents one or more physical buses and/or point-to-point connections that are connected by appropriate bridges, adapters, or controllers. The bus 1716, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computing system 1700 may share a similar computer processor architecture as that of a personal computer, tablet computer, mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computing system 1700.

While the main memory 1706, non-volatile memory 1710, and storage medium 1726 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1728. The term "machine-readable medium" and "storage medium" shall also be taken to include any medium that is capable of storing, encoding, or carrying a set of instructions for execution by the computing system 1700.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1704, 1708, 1728) set at various times in various memory and storage devices in a computing device. When read and executed by the one or more processors 1702, the instruction(s) cause the computing system 1700 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1710, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 1712 enables the computing system 1700 to mediate data in a network 1714 with an entity that is external to the computing system 1700 through any communication protocol supported by the computing system 1700 and the external entity. The network adapter 1712 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1712 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

We claim:

1. A method for split screen display of multiple applications, the method comprising:
    detecting, by a device, an instruction to start a split screen mode based on two or more applications having been dragged, by a user of the device, to a designated area on a screen of the device for inclusion in the split screen mode, wherein the designated area is an icon on a home screen that represents the split screen mode; and
    in response to the instruction to start the split screen mode, causing the two or more applications to each display their respective user interfaces on different display portions of a screen of the device,
    wherein the method further comprises:
    in response to detecting a triggering operation by the user on the icon, displaying a menu including a search bar for the user to search for applications on the device.

2. The method of claim 1, further comprising: in response to the two or more applications being dragged to the designated area, displaying a user selection interface to prompt the user of the device to save the two or more applications as a default group.

3. The method of claim 2, further comprising: in response to the user selecting to save the two or more applications as the default group, generating a customized icon.

4. The method of claim 3, wherein the customized icon is configured to, upon actuation, enter the split screen mode with applications saved as the default group.

5. The method of claim 3, wherein an appearance of the customized icon includes a collage of visual cues representing each of the two or more applications.

6. The method of claim 1,
wherein the icon is one of at least two icons displayed on the home screen, each of the at least two icons representing a different variant of the split screen mode.

7. The method of claim 6, wherein each variant of the split screen mode has a different number of display portions for the split screen display.

8. The method of claim 1, further comprising:
receiving, from the user, an input including a desirable change in size, shape, and/or location for one display portion; and
adjusting the one display portion based on the input.

9. The method of claim 8, wherein the input includes changing the one display portion to enter or exit full screen.

10. The method of claim 8, wherein the input includes a drag on a split screen line, which separates the one display portion from a neighboring display portion, the method further comprising:
adjusting the neighboring display portion to complement how the one display portion is adjusted.

11. The method of claim 8, wherein the input includes dragging a first display portion and dropping thereof onto a second display portion, and wherein the adjusting includes:
switching a location and a size of display between the first and second display portions.

12. The method of claim 1, further comprising:
receiving, from the user, a drag of an item from a first display portion to a second display portion, each display portion corresponding to a different application; and
in response to the drag of the item, causing an application associated with the first display portion to convey information about the item to another application associated with the second display portion.

13. The method of claim 12, wherein the information conveyed about the item includes a specific location identifying where the item is dropped inside the second display portion.

14. The method of claim 1, further comprising:
detecting a drag action being performed on the designated area so as to enable the user to adjust a location of the designated area with respect to the screen.

15. The method of claim 1, wherein the device includes a foldable screen display with a folding line, and wherein at least one split screen line, which separates one display portion from a neighboring display portion, is on the folding line.

16. The method of claim 1, wherein the icon is an icon of a split screen application for the split screen mode.

17. The method of claim 1, further comprising:
in response to detecting a triggering operation by the user on the icon, displaying a menu to prompt the user to select the number of display portions for the split screen mode.

18. The method of claim 6, wherein the menu further comprises at least one of the following:
a prompt for the user to select a layout of the display portions for the split-screen mode,
a prompt for the user to select applications included in the split screen mode, and
a start button to initiate the split-screen mode.

19. A device comprising:
a processor; and
a memory having instructions stored thereon that, when executed by the processor, cause the device to:
detect an instruction to start a split screen mode based on two or more applications having been dragged, by a user of the device, to a designated area on a screen of the device for inclusion in the split screen mode, wherein the designated area is an icon on a home screen that represents the split screen mode; and
in response to the instruction to start the split screen mode, cause the two or more applications to each display their respective user interfaces on different display portions of a screen of the device,
wherein the device is further caused to:
in response to detecting a triggering operation by the user on the icon, display a menu including a search bar for the user to search for applications on the device.

20. A non-transitory computer-readable medium containing instructions, execution of which in a computer system causes the computer system to:
detect an instruction to start a split screen mode based on two or more applications having been dragged, by a user of the device, to a designated area on a screen of the device for inclusion in the split screen mode, wherein the designated area is an icon on a home screen that represents the split screen mode; and
in response to the instruction to start the split screen mode, cause the two or more applications to each display their respective user interfaces on different display portions of a screen of the device,
wherein the computer system is further caused to:
in response to detecting a triggering operation by the user on the icon, display a menu including a search bar for the user to search for applications on the device.

* * * * *